(12) United States Patent
Ding et al.

(10) Patent No.: US 11,671,656 B2
(45) Date of Patent: Jun. 6, 2023

(54) METHOD FOR SELECTING RESOLUTION SWITCHING ALGORITHM, COMPUTING DEVICE, AND COMPUTER-PROGRAM PRODUCT

(71) Applicant: Shanghai Bilibili Technology Co., Ltd., Shanghai (CN)

(72) Inventors: Jianqiang Ding, Shanghai (CN); Zhaoxin Tan, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 17/373,464

(22) Filed: Jul. 12, 2021

(65) Prior Publication Data

US 2021/0337271 A1 Oct. 28, 2021

Related U.S. Application Data

(63) Continuation of application No. PCT/CN2019/128455, filed on Dec. 25, 2019.

(30) Foreign Application Priority Data

Jan. 30, 2019 (CN) .......................... 201910092652.5

(51) Int. Cl.
*H04N 21/4402* (2011.01)
*H04N 21/442* (2011.01)
*H04N 21/485* (2011.01)

(52) U.S. Cl.
CPC .............. *H04N 21/440263* (2013.01); *H04N 21/44209* (2013.01); *H04N 21/4858* (2013.01)

(58) Field of Classification Search
CPC ..... H04N 21/440263; H04N 21/44209; H04N 21/4858
See application file for complete search history.

(56) References Cited

U.S. PATENT DOCUMENTS 9,554,132 B2 * 1/2017 Crenshaw ............ H04N 19/587
2013/0297743 A1 11/2013 Eschet et al.
(Continued)

FOREIGN PATENT DOCUMENTS

CN 101656887 A 2/2010
CN 103517143 A 1/2014
(Continued)

OTHER PUBLICATIONS

International Search Report dated Apr. 1, 2020, in International application No. PCT/CN2019/128455, filed on Dec. 25, 2019.
(Continued)

*Primary Examiner* — Joshua D Taylor
(74) *Attorney, Agent, or Firm* — McAndrews, Held & Malloy, Ltd.

(57) ABSTRACT

A method is provided. The method includes: obtaining multiple association relationships, wherein each association relationship includes a resolution switching algorithm and a historical freeze rate; determining a historical freeze rate meeting a preset condition from the multiple association relationships; and selecting a target resolution switching algorithm from a corresponding association relationship of the association relationships according to the historical freeze rate meeting the preset condition, wherein the target resolution switching algorithm is used for switching a resolution of a video. A system, a computing device, and a computer-program product are also provided.

17 Claims, 4 Drawing Sheets

(56) References Cited

U.S. PATENT DOCUMENTS

2016/0011874 A1\* 1/2016 Orenstein ............. G06F 9/3861
                                                        712/237
2016/0294656 A1\* 10/2016 Tse ..................... H04L 43/0888

FOREIGN PATENT DOCUMENTS

| CN | 103763618 A | 4/2014 | |
|---|---|---|---|
| CN | 107864402 A | 3/2018 | |
| CN | 108200470 A | 6/2018 | |
| CN | 108271048 A | 7/2018 | |
| CN | 108769760 A | 11/2018 | |
| CN | 108810468 A | 11/2018 | |
| WO | WO-2015027717 A1 \* | 3/2015 | ........... H04N 21/462 |

OTHER PUBLICATIONS

Kleinrouweler, Jan Willem et al: "Improving Mobile Video Quality Through Predictive Channel Quality Based Buffering," 2018 30th International Teletraffic Congress (ITC 30), ITC Press, vol. 1, Sep. 3, 2018 (Sep. 3, 2018), pp. 236-244, XP033421270.

\* cited by examiner

METHOD FOR SELECTING RESOLUTION SWITCHING ALGORITHM, COMPUTING DEVICE, AND COMPUTER-PROGRAM PRODUCT

CROSS REFERENCE TO RELATED APPLICATION

The present application is a continuation under 35 U.S.C. 111(a) of PCT International Application No. PCT/CN2019/128455, filed on Dec. 25, 2019, which claims priority to Chinese patent application No. 201910092652.5, filed on Jan. 30, 2019, the entire contents of which are hereby incorporated by reference in their entirety for all purposes.

TECHNICAL FIELD

The present application relates to computer technologies, and particularly to a method for selecting a resolution switching algorithm, a computing device, and a computer-program product.

BACKGROUND

With the development of video service, users have an increasing demand for watching videos online. Video resolution and playing fluency are key factors affecting user's experience. In order to meet the needs of different users, on a streaming media platform, a same film source often has different resolutions, for example, standard resolution, high resolution, super resolution and so on.

SUMMARY

One aspect of the present application provides a method, the method including: obtaining multiple association relationships, wherein each association relationship includes a resolution switching algorithm and a historical freeze rate; determining a historical freeze rate meeting a preset condition from the multiple association relationships; and selecting a target resolution switching algorithm from a corresponding association relationship of the association relationships according to the historical freeze rate meeting the preset condition, wherein the target resolution switching algorithm is used for switching a resolution of a video.

Another aspect of the present application provides a computing device, the computing device including: one or more processors; and one or more non-transitory computer-readable storage mediums containing instructions configured to cause the one or more processors to perform operations including: obtaining multiple association relationships, wherein each association relationship includes a resolution switching algorithm and a historical freeze rate; determining a historical freeze rate meeting a preset condition from the multiple association relationships; and selecting a target resolution switching algorithm from a corresponding association relationship of the association relationships according to the historical freeze rate meeting the preset condition, wherein the target resolution switching algorithm is used for switching a resolution of a video.

Another aspect of the present application provides a non-transitory computer-program product tangibly embodied in a machine-readable non-transitory storage medium that includes instructions configured to cause one or more processors to perform operations including: obtaining multiple association relationships, wherein each association relationship includes a resolution switching algorithm and a historical freeze rate; determining a historical freeze rate meeting a preset condition from the multiple association relationships; and selecting a target resolution switching algorithm from a corresponding association relationship of the association relationships according to the historical freeze rate meeting the preset condition, wherein the target resolution switching algorithm is used for switching a resolution of a video.

DETAILED DESCRIPTION OF EMBODIMENTS

To make the embodiments and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

Inventors found that in the related art, a user can only manually switch the resolution, and after the user manually switches the resolution, the video may be frozen due to unsupported network speed, resulting in poor user experience.

In view of this, the present application provides a method for selecting a resolution switching algorithm, a computing device, and a computer-program product.

The method for selecting a resolution switching algorithm provided by the present application stores multiple association relationships in the system in advance, each association relationship may be an association relationship between a resolution switching algorithm and a historical freeze rate corresponding to the resolution switching algorithm, and finds out a historical freeze rate meeting a preset condition (for example, a historical freeze rate having a value less than a certain value) from the association relationships, and then selects a target resolution switching algorithm for switching the video from the association relationship corresponding to the historical freeze rate meeting the preset condition. Since the historical freeze rate corresponding to the target resolution switching algorithm selected by the embodiments of the present application is relatively low, when the video is switched with the target resolution switching algorithm selected, an effect of reducing the video freeze rate can be realized, and since all the resolution switching algorithms selected in the embodiments of the present application can realize an effect of automatically switching video resolution, the embodiments of the present application can avoid the defects in the related art that the resolution can only be manually switched and the video may be frozen due to unsupported network speed after the resolution is manually switched.

Figure 1:
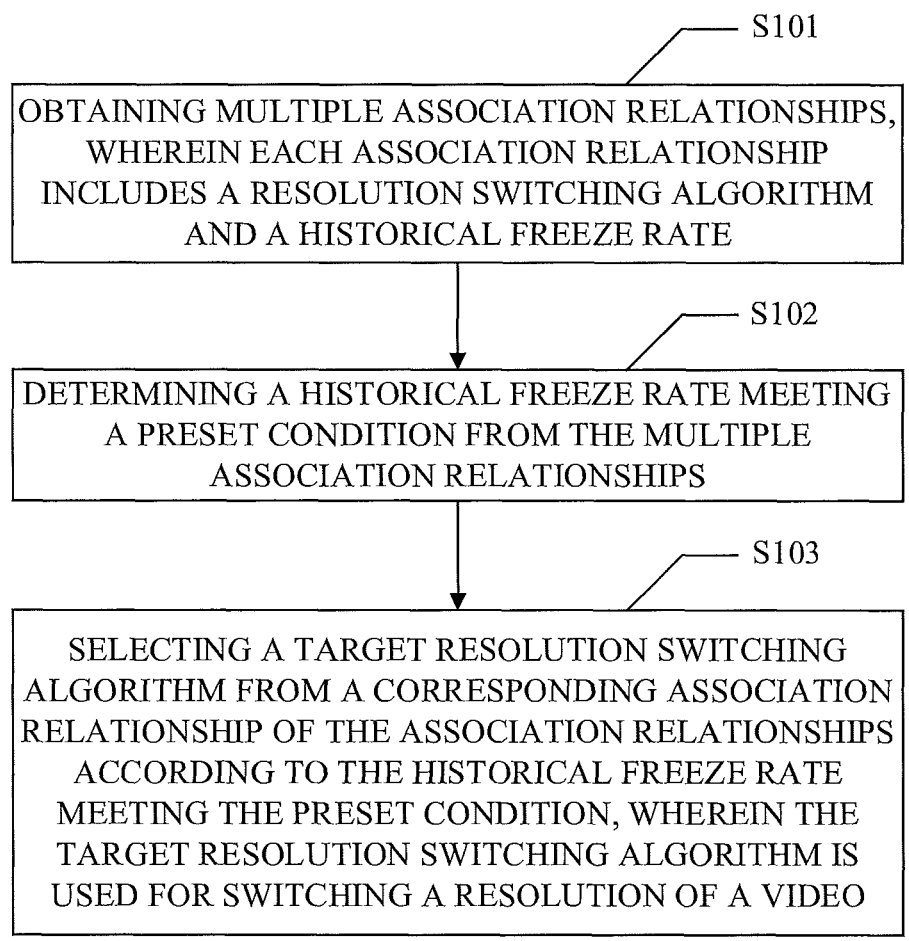
FIG. 1 illustrates a flowchart of a method for selecting a resolution switching algorithm according to some embodiments of the present application.

FIG. 1 illustrates a flowchart of the method for selecting a resolution switching algorithm according to some embodiments of the present application.

As shown in FIG. 1, the method for selecting a resolution switching algorithm may include steps S101~S103.

Step S101, obtaining multiple association relationships, where each association relationship includes a resolution switching algorithm and a historical freeze rate.

A selection scheme of the resolution switching algorithm provided by the embodiments of the application can be applied to a server, and when a client, such as a web terminal, plays a video, the server may be requested to provide a resolution switching algorithm which is better and can dynamically switch the resolution of the video, then the server can select the target resolution switching algorithm by executing the scheme provided by the embodiments of the present application, and return the target resolution switching algorithm to the client, so that the client can dynamically switch the resolution of the video based on the target resolution switching algorithm.

According to some embodiments of the present application, multiple association relationships may be stored in advance in the server, and each association relationship may include a resolution switching algorithm and a corresponding historical freeze rate when the resolution switching algorithm is applied to switch the resolution of the video. The resolution switching algorithm may be abrThroughput (an adaptive bitrate switching algorithm based on throughput (also known as network speed)), abrBola (an adaptive bitrate switching algorithm based on current buffer), or abrDynamic (an adaptive bitrate switching algorithm dynamically adjusted based on abrThroughput and abrBola).

According to some embodiments of the present application, for the historical freeze rate corresponding to each resolution switching algorithm, a total playing duration of the video played may be counted, and a total number of freezes corresponding to the resolution switching algorithm which is used to switch the resolution of the video may be counted, and then the total number of freezes is divided by the total playing duration to obtain the historical freeze rate corresponding to the resolution switching algorithm. In order to ensure accuracy as much as possible, the total playing duration corresponding to each resolution switching algorithm may be the same.

Step S102, determining a historical freeze rate meeting a preset condition from the multiple association relationships.

In some embodiments of the present application, the historical freeze rate meeting the preset condition may include a historical freeze rate with a minimum value, or the historical freeze rate meeting the preset condition may include a historical freeze rate with a value less than a preset threshold value. There may be one or more historical freeze rates meeting the preset condition.

Step S103, selecting a target resolution switching algorithm from a corresponding association relationship of the association relationships according to the historical freeze rate meeting the preset condition, where the target resolution switching algorithm is used for switching a resolution of a video.

According to some embodiments of the present application, if there is only one historical freeze rate meeting the preset condition, the corresponding association relationship is the association relationship where the historical freeze rate meeting the preset condition is located, and the target resolution switching algorithm is the resolution switching algorithm in the corresponding association relationship.

According to some embodiments of the present application, if there are multiple historical freeze rates meeting the preset condition, the corresponding association relationship is a set of association relationships where each historical freeze rate meeting the preset condition is located, and selecting the target resolution switching algorithm may be selecting (for example, randomly selecting) an algorithm from all of the resolution switching algorithms included in the set of association relationships as the target resolution switching algorithm.

In some embodiments, selecting the target resolution switching algorithm from a corresponding association relationship according to the historical freeze rate meeting the preset condition may include: receiving a network speed sent by a client, where the client is used for playing the video; and selecting the target resolution switching algorithm from the corresponding association relationship according to the historical freeze rate meeting the preset condition and the network speed. Selecting the target resolution switching algorithm from the corresponding association relationship according to the historical freeze rate meeting the preset condition and the network speed may include: obtaining a first weight of the historical freeze rate meeting the preset condition; obtaining a second weight of the network speed; and selecting the target resolution switching algorithm from the corresponding association relationship according to the historical freeze rate meeting the preset condition, the first weight, the network speed and the second weight.

In some embodiments of the present application, if there are multiple historical freeze rates meeting the preset condition, since the resolution switching algorithm and the historical freeze rate are in one-to-one correspondence, there are also multiple resolution switching algorithms corresponding to the multiple historical freeze rates meeting the preset condition. If one of the resolution switching algorithms is randomly selected as the target resolution switching algorithm, it is possible that a real freeze rate using the target resolution switching algorithm is much higher than the historical freeze rate corresponding to the target resolution switching algorithm due to a network speed problem of the client. In this situation, the network speed sent by the client may be received, the preset first weight and the preset second weight are obtained, and then the target resolution switching algorithm may be selected from the corresponding association relationship according to the historical freeze rate meeting the preset condition, the first weight, the network speed and the second weight.

For example, there are two historical freeze rates meeting the preset condition, which are historical freeze rate 1, and historical freeze rate 2, the resolution switching algorithm corresponding to the historical freeze rate 1 is abrThroughput, and the resolution switching algorithm corresponding to the historical freeze rate 2 is abrDynamic. The video played by the client is video A, and the corresponding network speed is network speed A. Then, multiplying the historical freeze rate 1 and the first weight, multiplying the network speed A and the second weight, and then summing the two into a value 1; multiplying the historical freeze rate 2 and the first weight, multiplying the network speed A and the second weight, and then summing the two into a value 2. After comparison, the value 2 is better than the value 1, thus the abrDynamic may be selected as the target resolution switching algorithm.

In some embodiments, the network speed provided by the client may be an average network speed of the client playing the video.

According to some embodiments of the present application, the client may determine data volume of the video downloaded within a certain time, and determine a duration consumed by downloading the video of the data volume, and then divide the data volume by the duration, to determine the average network speed. Of course, it may also be calculated multiple times to ensure accuracy of calculation results.

In some embodiments, the network speed provided by the client may be a historical network speed corresponding to a CDN (Content Delivery Network) used by the client to play the video.

According to some embodiments of the present application, the client may store multiple historical network speeds and the CDN corresponding to each historical network speed, and may store them in a map. The client may determine the CDN used for playing the video this time, and then determine the historical network speed corresponding to the CDN. The historical network speed may include a network speed when the client used the CDN to play the video in history. According to some embodiments, the historical network speed may be an average network speed when the client used the CDN to play the video last time.

For example, a stored data format map includes three CDNs and the historical network speed corresponding to each CDN, which are: 'cdna.acgvideo.com': 400 KB/s; 'cdnb.acgvideo.com': 500 KB/s; 'cdnc.acgvideo.com': 900 KB/s. If the CDN used to play the video this time is the cdna.acgvideo.com, since the historical network speed corresponding to the cdna.acgvideo.com is 400 KB/s, the client may send 400 KB/s to the server.

In some embodiments, the method for selecting a resolution switching algorithm may further include: determining a playing duration of the client playing the video; determining a number of freezes generated by switching the resolution of the video using the target resolution switching algorithm within the playing duration; and updating the historical freeze rate corresponding to the target resolution switching algorithm according to the playing duration and the number of freezes.

According to some embodiments of the present application, the client may actively send the playing duration of the video and the number of freezes generated by switching the resolution of the video using the target resolution switching algorithm within the playing duration to the server after stopping playing the video, the server may pre-store the number of freezes and the playing duration, and after a total playing duration of the video using the target resolution switching algorithm reaches a certain level, calculate a new freeze rate and then replace the historical freeze rate corresponding to the target resolution switching algorithm according to the new freeze rate.

The method for selecting a resolution switching algorithm provided by the present application stores multiple association relationships in the system in advance, each association relationship may be an association relationship between a resolution switching algorithm and a historical freeze rate corresponding to the resolution switching algorithm, and finds out a historical freeze rate meeting a preset condition (for example, a historical freeze rate having a value less than a certain value) from the association relationships, and then selects a target resolution switching algorithm for switching the video from the association relationship corresponding to the historical freeze rate meeting the preset condition. Since the historical freeze rate corresponding to the target resolution switching algorithm selected by the embodiments of the present application is relatively low, when the video is switched with the target resolution switching algorithm selected, the effect of reducing the video freeze rate can be realized, and since all the resolution switching algorithms selected in the embodiments of the present application can realize the effect of automatically switching video resolution, the embodiments of the present application can avoid the defects in the related art that the resolution can only be manually switched and the video may be frozen due to unsupported network speed after the resolution is manually switched.

Figure 2:
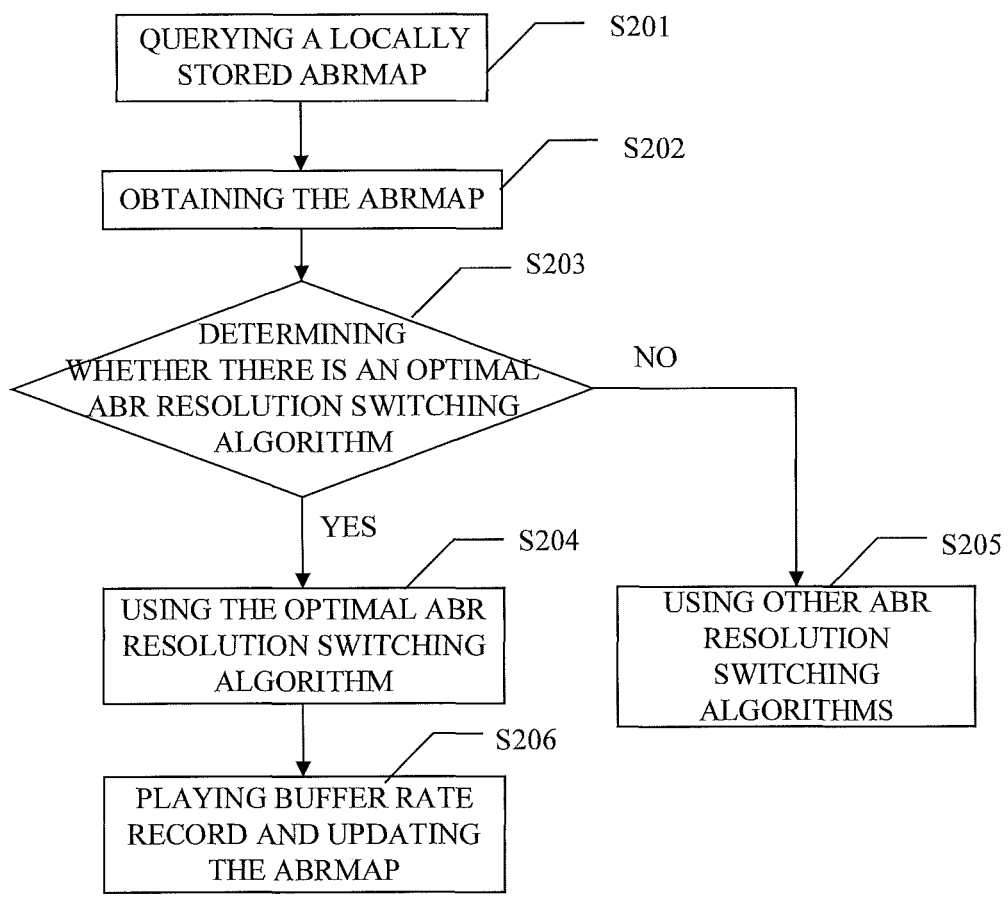
FIG. 2 illustrates a flowchart of the method for selecting a resolution switching algorithm according to some embodiments of the present application.

FIG. 2 illustrates a flowchart of the method for selecting a resolution switching algorithm according to some embodiments of the present application.

As shown in FIG. 2, the method for selecting a resolution switching algorithm may include steps S201~S206.

Step S201, querying an abrMap stored locally.

Step S202, obtaining the abrMap.

Step S203, determining whether there is an optimal abr resolution switching algorithm, if yes, executing a step S204, and if no, executing a step S205.

Step S204, using the optimal abr resolution switching algorithm.

Step S205, using other abr resolution switching algorithms.

Step S206, playing buffer rate record and updating the abrMap.

In some embodiments of the present application, whether the abrMap is stored this time may be queried, where the abrMap may store abrThroughput and the historical freeze rate corresponding to the abrThroughput, abrBola and the historical freeze rate corresponding to the abrBola, abrDynamic and the historical freeze rate corresponding to the abrDynamic. If it is stored, the abrMap is obtained, and then determine whether there is an optimal abr (Adaptive Bitrate, also known as adaptive bit rate/adaptive code rate) resolution switching algorithm in the abrMap. Determining whether there is the optimal abr resolution switching algorithm in the abrMap may refer to the above embodiments, which will not be repeated here. If there is the optimal abr resolution switching algorithm in the abrMap, the optimal abr resolution switching algorithm is sent to the client, so that the client switches the resolution of the video automatically based on the optimal abr resolution switching algorithm. If there is no optimal abr resolution switching algorithm in the abrMap, any one of the other abr resolution switching algorithms in the abrMap is sent to the client, so that the client switches the resolution of the video automatically based on the abr resolution switching algorithm. Further, according to the playing buffer rate record of the client playing the video, such as the playing duration and the number of freezes described in the above embodiments, updating the historical freeze rate of the corresponding abr resolution switching algorithm in the abrMap. After the updating, the optimal abr resolution switching algorithm may be changed.

Figure 3:
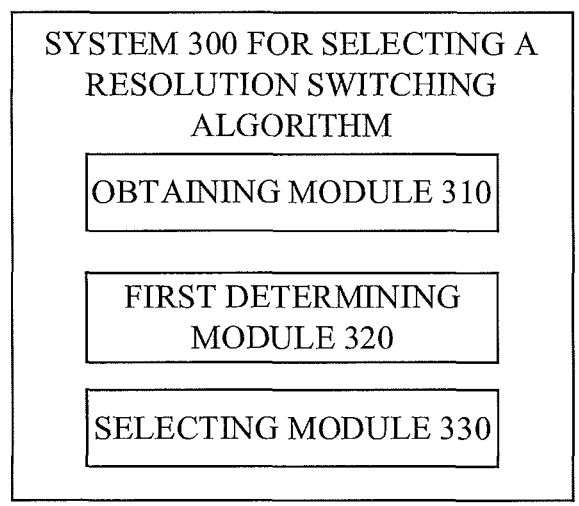
FIG. 3 illustrates a block diagram of a system for selecting a resolution switching algorithm according to some embodiments of the present application.

FIG. 3 illustrates a block diagram of a system for selecting a resolution switching algorithm according to some embodiments of the present application.

As shown in FIG. 3, a system 300 for selecting a resolution switching algorithm may include an obtaining module 310, a first determining module 320, and a selecting module 330.

The obtaining module 310 is configured to obtain multiple association relationships, where each association relationship includes a resolution switching algorithm and a historical freeze rate.

The first determining module 320 is configured to determine a historical freeze rate meeting a preset condition from the multiple association relationships.

The selecting module 330 is configured to select a target resolution switching algorithm from a corresponding association relationship of the association relationships according to the historical freeze rate meeting the preset condition, where the target resolution switching algorithm is used for switching a resolution of a video.

The system for selecting a resolution switching algorithm provided by the present application stores multiple association relationships in the system in advance, each association relationship may be an association relationship between a resolution switching algorithm and a historical freeze rate corresponding to the resolution switching algorithm, and finds out a historical freeze rate meeting a preset condition (for example, a historical freeze rate having a value less than a certain value) from the association relationships, and then selects a target resolution switching algorithm for switching the video from the association relationship corresponding to the historical freeze rate meeting the preset condition. Since the historical freeze rate corresponding to the target resolution switching algorithm selected by the embodiments of the present application is relatively low, when the video is switched with the target resolution switching algorithm selected, the effect of reducing the video freeze rate can be realized, and since all the resolution switching algorithms selected in the embodiments of the present application can realize the effect of automatically switching video resolution, the embodiments of the present application can avoid the defects in the related art that the resolution can only be manually switched and the video may be frozen due to unsupported network speed after the resolution is manually switched.

In some embodiments, the selecting module may include: a receiving unit for receiving a network speed sent by a client, where the client is used for playing the video; and a selecting unit for selecting the target resolution switching algorithm from the corresponding association relationship according to the historical freeze rate meeting the preset condition and the network speed.

In some embodiments, the selecting unit may include: a first obtaining subunit for obtaining a first weight of the historical freeze rate meeting the preset condition; a second obtaining subunit for obtaining a second weight of the network speed; and a selecting subunit for selecting the target resolution switching algorithm from the corresponding association relationship according to the historical freeze rate meeting the preset condition, the first weight, the network speed and the second weight.

In some embodiments, the network speed may include an average network speed of the client playing the video.

In some embodiments, the network speed may include a historical network speed corresponding to a CDN used by the client to play the video.

In some embodiments, the historical freeze rate meeting the preset condition may include a historical freeze rate with a minimum value.

In some embodiments, the system may further include: a second determining module for determining a playing duration of the client playing the video; a third determining module for determining a number of freezes generated by switching the resolution of the video using the target resolution switching algorithm within the playing duration; and an updating module for updating the historical freeze rate corresponding to the target resolution switching algorithm according to the playing duration and the number of freezes.

Figure 4:
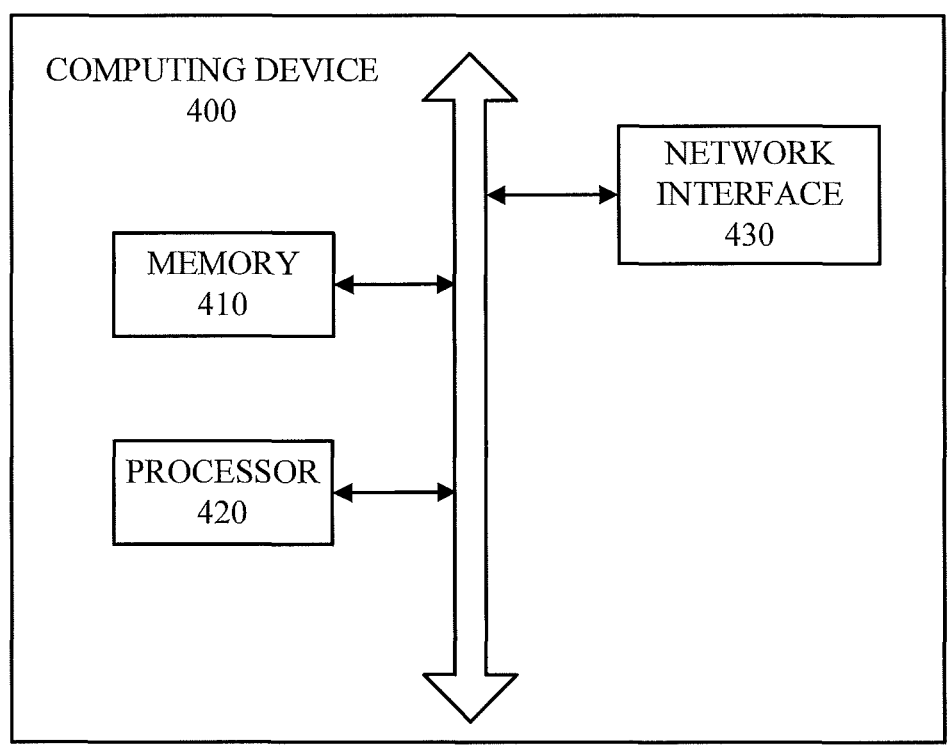
FIG. 4 illustrates a diagram of hardware architecture of a computing device for implementing the method for selecting a resolution switching algorithm according to some embodiments of the present application.

FIG. 4 illustrates a diagram of hardware architecture of a computing device for implementing the method for selecting a resolution switching algorithm according to some embodiments of the present application. In some embodiments, the computing device 400 is a device capable of automatically performing numerical calculations and/or information processing according to predefined or stored instructions. For example, the computing device 400 may be a Smartphone, a tablet, a laptop, a desktop computer, a rack server, a blade server, a tower server, or a cabinet server (including stand-alone servers, or a cluster of multiple servers), and so on. As shown in FIG. 4, the computing device 400 includes, but is not limited to, a memory 410, a processor 420, and a network interface 430 that can be communicated with each other through a system bus.

The memory 410 includes at least one type of computer-readable storage medium. The readable storage medium includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 410 may be an internal storage module of the computing device 400 such as a hard disk or a memory of the computing device 400. In other embodiments, the memory 410 may also be an external storage device of the computing device 400, such as a plugged hard disk provided on the computing device 400, a smart media card (SMC), a secure digital (SD) card, a flash memory card, and the like. Of course, the memory 410 may also include both the internal storage module and the external storage device of the computing device 400. In some embodiments, the memory 410 is generally used to store an operating system and various types of application software installed in the computing device 400 such as program codes of the method for selecting a resolution switching algorithm and the like. In addition, the memory 410 may also be used to temporarily store various types of data that have been or will be output.

The processor 420, in some embodiments, may be a central processing unit (CPU), a controller, a microprocessor, or other data processing chip. The processor 420 is generally used to control the overall operation of the computing device 400 such as performing control and processing related to data interaction or communication with the computing device 400. In some embodiments, the processor 420 is used to run program code or process data stored in the memory 410.

The network interface 430 may include a wireless network interface or a wired network interface which is generally used to establish a communication connection between the computing device 400 and other computing devices. For example, the network interface 430 is used for connecting the computing device 400 to an external terminal via a network and establishing a data transmission channel and a communication connection between the computing device 400 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 4 shows only a computing device 400 having components 410-430, but it is understood that it is not required to implement all of the shown components and that more or fewer parts can be implemented in lieu thereof.

In some embodiments, the method for selecting a resolution switching algorithm stored in the memory 410 may be divided into one or more program modules and executed by one or more processors (the processor 420 in the embodiments) to complete the present application.

The embodiments further provide a non-transitory computer-program product tangibly embodied in a machine-readable non-transitory storage medium (e.g. non-transitory computer-readable storage medium) that comprises instructions configured to cause one or more processors to implement steps of the method for selecting a resolution switching algorithm in the above embodiments.

In some embodiments, the computer-readable storage medium includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the computer-readable storage medium may be an internal storage module of the computing device such as a hard disk or a memory of the computing device. In other embodiments, the memory may also be an external storage device of the computing device, such as a plugged hard disk provided on the computing device, a smart media card (SMC), a secure digital (SD) card, a flash memory card, and the like. Of course, the computer-readable storage medium may also include both the internal storage module and the external storage device of the computing device. In some embodiments, the computer-readable storage medium is generally used to store an operating system and various types of application software installed in the computing device such as program codes of the method for selecting a resolution switching algorithm and the like. In addition, the memory may also be used to temporarily store various types of data that have been or will be outputted.

Apparently, it should be appreciated by those skilled in the art that each module or step described in the embodiments of the present application can be realized by a general-purpose and that the modules or steps may be integrated on a single computing device or distributed on a network consisting of a plurality of computing devices. The modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules, or several of the modules or steps are formed into integrated circuit modules. Therefore, the present application is not limited to the combination of specific hardware and software.

The embodiments described above are merely illustrative embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
   obtaining multiple association relationships, wherein each association relationship comprises a resolution switching algorithm and a corresponding historical freeze rate, and wherein the corresponding historical freeze rate is a freeze rate when the resolution switching algorithm was previously applied to switch a resolution of a video;
   determining a historical freeze rate meeting a preset condition from the multiple association relationships, wherein the historical freeze rate meeting the preset condition comprises a historical freeze rate with a minimum value or a historical freeze rate with a value less than a preset threshold value; and
   selecting a target resolution switching algorithm from a corresponding association relationship of the multiple association relationships which comprises the historical freeze rate meeting the preset condition, wherein the target resolution switching algorithm is used for switching the resolution of the video.

2. The method of claim 1, wherein the selecting the target resolution switching algorithm comprises:
   receiving a network speed sent by a client, wherein the client is used for playing the video; and
   selecting the target resolution switching algorithm from the corresponding association relationship according to the historical freeze rate meeting the preset condition and the network speed.

3. The method of claim 2, wherein the selecting the target resolution switching algorithm from the corresponding association relationship according to the historical freeze rate meeting the preset condition and the network speed comprises:
   obtaining a first weight of the historical freeze rate meeting the preset condition;
   obtaining a second weight of the network speed; and
   selecting the target resolution switching algorithm from the corresponding association relationship according to the historical freeze rate meeting the preset condition, the first weight, the network speed and the second weight.

4. The method of claim 2, wherein the network speed comprises an average network speed of the client playing the video.

5. The method of claim 2, wherein the network speed comprises a historical network speed corresponding to a CDN used by the client to play the video.

6. The method of claim 1, further comprising:
   determining a playing duration of a client playing the video;
   determining a number of freezes generated by switching the resolution of the video using the target resolution switching algorithm within the playing duration; and
   updating the historical freeze rate corresponding to the target resolution switching algorithm according to the playing duration and the number of freezes.

7. A computing device, comprising:
   one or more processors; and
   one or more non-transitory computer-readable storage mediums containing instructions configured to cause the one or more processors to perform operations comprising:
   obtaining multiple association relationships, wherein each association relationship comprises a resolution switching algorithm and a historical freeze rate, and wherein the corresponding historical freeze rate is a freeze rate when the resolution switching algorithm was previously applied to switch a resolution of a video;

determining a historical freeze rate meeting a preset condition from the multiple association relationships, wherein the historical freeze rate meeting the preset condition comprises a historical freeze rate with a minimum value or a historical freeze rate with a value less than a preset threshold value; and selecting a target resolution switching algorithm from a corresponding association relationship of the multiple association relationships which comprises the historical freeze rate meeting the preset condition, wherein the target resolution switching algorithm is used for switching the resolution of the video.

8. The computing device of claim 7, wherein the selecting the target resolution switching algorithm comprises:

receiving a network speed sent by a client, wherein the client is used for playing the video; and selecting the target resolution switching algorithm from the corresponding association relationship according to the historical freeze rate meeting the preset condition and the network speed.

9. The computing device of claim 8, wherein the selecting the target resolution switching algorithm from the corresponding association relationship according to the historical freeze rate meeting the preset condition and the network speed comprises:

obtaining a first weight of the historical freeze rate meeting the preset condition;

obtaining a second weight of the network speed; and selecting the target resolution switching algorithm from the corresponding association relationship according to the historical freeze rate meeting the preset condition, the first weight, the network speed and the second weight.

10. The computing device of claim 8, wherein the network speed comprises an average network speed of the client playing the video.

11. The computing device of claim 8, wherein the network speed comprises a historical network speed corresponding to a CDN used by the client to play the video.

12. The computing device of claim 7, wherein the one or more non-transitory computer-readable storage mediums further contains instructions configured to cause the one or more processors to perform operations comprising:

determining a playing duration of a client playing the video;

determining a number of freezes generated by switching the resolution of the video using the target resolution switching algorithm within the playing duration; and updating the historical freeze rate corresponding to the target resolution switching algorithm according to the playing duration and the number of freezes.

13. A non-transitory computer-program product tangibly embodied in a machine-readable non-transitory storage medium that comprises instructions configured to cause one or more processors to perform operations comprising:

obtaining multiple association relationships, wherein each association relationship comprises a resolution switching algorithm and a historical freeze rate, and wherein the corresponding historical freeze rate is a freeze rate when the resolution switching algorithm was previously applied to switch a resolution of a video;

determining a historical freeze rate meeting a preset condition from the multiple association relationships, wherein the historical freeze rate meeting the preset condition comprises a historical freeze rate with a minimum value or a historical freeze rate with a value less than a preset threshold value; and selecting a target resolution switching algorithm from a corresponding association relationship of the multiple association relationships which comprises the historical freeze rate meeting the preset condition, wherein the target resolution switching algorithm is used for switching the resolution of the video.

14. The computer-program product of claim 13, wherein the selecting the target resolution switching algorithm comprises:

receiving a network speed sent by a client, wherein the client is used for playing the video; and selecting the target resolution switching algorithm from the corresponding association relationship according to the historical freeze rate meeting the preset condition and the network speed.

15. The computer-program product of claim 14, wherein the selecting the target resolution switching algorithm from the corresponding association relationship according to the historical freeze rate meeting the preset condition and the network speed comprises:

obtaining a first weight of the historical freeze rate meeting the preset condition;

obtaining a second weight of the network speed; and selecting the target resolution switching algorithm from the corresponding association relationship according to the historical freeze rate meeting the preset condition, the first weight, the network speed and the second weight.

16. The computer-program product of claim 14, wherein the network speed comprises an average network speed of the client playing the video.

17. The computer-program product of claim 14, wherein the network speed comprises a historical network speed corresponding to a CDN used by the client to play the video.

* * * * *